(12) United States Patent
Tiwari et al.

(10) Patent No.: US 10,108,728 B2
(45) Date of Patent: Oct. 23, 2018

(54) PROVISION OF LOCATION INFORMATION WITH SEARCH QUERIES FROM LOCATION UNAWARE DEVICES TO INCREASE USER INTERACTION PERFORMANCE

(71) Applicant: Microsoft Technology Licensing, LLC, Redmond, WA (US)

(72) Inventors: Anunay Tiwari, Hyderabad (IN); Gurpreet Singh, Delhi (IN); Arun Prakash Mariyappa, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 389 days.

(21) Appl. No.: 14/833,091

(22) Filed: Aug. 22, 2015

(65) Prior Publication Data
US 2017/0052965 A1   Feb. 23, 2017

(51) Int. Cl.
*G06F 17/30* (2006.01)
*H04L 29/08* (2006.01)

(52) U.S. Cl.
CPC .... *G06F 17/3087* (2013.01); *G06F 17/30241* (2013.01); *H04L 67/02* (2013.01); *H04L 67/141* (2013.01); *H04L 67/18* (2013.01)

(58) Field of Classification Search
CPC .......... G06F 17/3087; G06F 17/30241; H04L 67/18; H04L 67/02; H04L 67/141
See application file for complete search history.

(56) References Cited

U.S. PATENT DOCUMENTS 8,326,315 B2   12/2012   Phillips et al.
8,369,266 B2   2/2013   Jin et al.
(Continued)

OTHER PUBLICATIONS

"International Search Report and Written Opinion Issued in PCT Application No. PCT/US2016/047668", dated Oct. 11, 2016, 11 Pages.
Patwari, et al., "Relative Location in Wireless Networks", In Proceedings of IEEE VTS 53rd Vehicular Technology Conference, May 6, 2001, 5 pages.
Stuedi, et al., "WhereStore: Location-based Data Storage for Mobile Devices Interacting with the Cloud", In Proceedings of 1st ACM Workshop on Mobile Cloud Computing & Services: Social Networks and Beyond, Jun. 15, 2010, 8 pages.
(Continued)

*Primary Examiner* — Scott A. Waldron
*Assistant Examiner* — Fatima P Mina
(74) *Attorney, Agent, or Firm* — The Watson I.P. Group, PLC; Vladan M. Vasiljevic

(57) ABSTRACT

The geographic location obtained by a location-aware computing device can be shared with a location-unaware computing device such that user interaction with a search engine through the location-unaware computing device can still include, when appropriate, a geographic location associated with the user, thereby increasing the relevance and aptness of the search results presented to the user and, accordingly, increasing user interaction performance with the search engine. Short range communicational connections can be used to share location information prior to being utilized in conjunction with searches. Location information can be provided, from a location-aware computing device, to a centralized, networked computing device, and associated thereon with a user identifier, thereby enabling associated location information to be utilized in conjunction with that user's searches. Location information can also be associated with an entity to improve the identification of such an entity as being responsive to other users' search queries.

20 Claims, 5 Drawing Sheets

(56) References Cited

U.S. PATENT DOCUMENTS

| | | | |
|---|---|---|---|
| 8,965,407 B2 | 2/2015 | Dave et al. | |
| 2006/0240841 A1 | 10/2006 | Bhattacharya | |
| 2009/0047972 A1* | 2/2009 | Neeraj | G06Q 10/10 |
| | | | 455/456.1 |
| 2010/0150120 A1* | 6/2010 | Schlicht | H04W 4/20 |
| | | | 370/338 |
| 2010/0325194 A1* | 12/2010 | Williamson | H04W 4/02 |
| | | | 709/203 |
| 2011/0087685 A1 | 4/2011 | Lin et al. | |
| 2011/0202514 A1 | 8/2011 | Singh | |
| 2012/0023088 A1 | 1/2012 | Cheng et al. | |
| 2012/0166416 A1* | 6/2012 | Murdock | G06F 17/3087 |
| | | | 707/711 |
| 2012/0190386 A1 | 7/2012 | Anderson | |
| 2013/0060743 A1 | 3/2013 | Yahyaoui et al. | |
| 2013/0122863 A1 | 5/2013 | Chen et al. | |
| 2013/0325345 A1 | 12/2013 | Byrne | |
| 2014/0045450 A1* | 2/2014 | Ballantyne | H04W 4/22 |
| | | | 455/404.2 |
| 2014/0207748 A1* | 7/2014 | Sood | G06F 17/3097 |
| | | | 707/706 |

OTHER PUBLICATIONS

"Revolutionary SPOT Connect Application", Published on: Jun. 30, 2012 Available at: http://www.findmespot.com/en/index.php?cid=119.

Landspurg, Thomas, "Adding Location to a Non GPS Phone: Introducing CellID", Published on: Sep. 23, 2008 Available at: http://mobiforge.com/design-development/adding-location-a-non-gps-phone-introducing-cellid.

Vladoiu, et al., "Toward Location-based Services using GPS-based Devices", In Proceedings of World Congress on Engineering, vol. 1, Jul. 2, 2008, 6 pages.

"ZuluTime® Technology Delivers a New Approach to Solving Location-based Business Problems in Interior Spaces where other Methodologies Come Up Short", Published on: Apr. 10, 2011 Available at: http://www.zulutimecorp.com/technology/.

Zheng, et al., "Collaborative Location and Activity Recommendations with GPS History Data", In Proceedings of 19th International Conference on World Wide Web, Apr. 26, 2010, 10 pages.

* cited by examiner

PROVISION OF LOCATION INFORMATION WITH SEARCH QUERIES FROM LOCATION UNAWARE DEVICES TO INCREASE USER INTERACTION PERFORMANCE

BACKGROUND

As network communications among multiple computing devices have become ubiquitous, the quantity of information available via such network communications has increased exponentially. For example, the ubiquitous Internet and World Wide Web comprise information sourced by a vast array of entities throughout the world, including corporations, universities, individuals and the like. Due to the sheer volume of information available to computing devices through network communications with other computing devices, users increasingly turn to search engines to find the information they seek. Search engines typically enable users to search for any topic and receive, from this vast volume of information, identifications of specific content that is deemed to be responsive to, or associated with, the users' queries. User queries to search engines can comprise queries that explicitly identify a particular geographic location. In such instances, search engines can utilize the explicitly identified geographic location to more accurately identify content deemed to be responsive to such a query. User queries can also comprise queries that only implicitly reference a particular geographic location, such as queries for information associated with geographic locations that are proximate to a searching user's current geographic location. In such instances, if the user's computing device is a location-aware computing device, such as the ubiquitous GPS-enabled cell phone, then the user's current geographic location can be provided with the user's query and the search engine can, again, utilize such geographic information to more accurately identify contents deemed to be responsive to such a query.

SUMMARY

The geographic location obtained by a location-aware computing device can be shared with a location-unaware computing device such that user interaction with a search engine through the location-unaware computing device can still include, when appropriate, a geographic location associated with the user, thereby increasing the relevance and aptness of the search results presented to the user and, accordingly, increasing user interaction performance with the search engine. The geographic location obtained by a location-aware computing device can be shared with the location-unaware computing device through short range communicational connections, such that both the location-aware computing device and the location-unaware computing device are physically proximate to one another, and the geographic location obtained by the location-aware computing device can, appropriately, be utilized as a geographic location of the location-unaware computing device as well. Geographic location information can be received by a location-unaware computing device prior to being utilized in conjunction with searches issued to a search engine through such a location-unaware computing device, and can be updated on a determined periodicity. Geographic location information can be provided, from a location-aware computing device, to a centralized networked computing device and associated thereon with a user identifier such that the user corresponding to such a user identifier, when issuing searches to a search engine through a location-unaware computing device, can have the associated geographic location information utilized in conjunction with such searches. In such an instance, the geographic location information need not be locally retained or exchanged. Geographic location information can also be associated with an entity, such as an entity whose geographic location is variant, to improve the identification of such an entity as being responsive to other users' search queries.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

Figure 1:
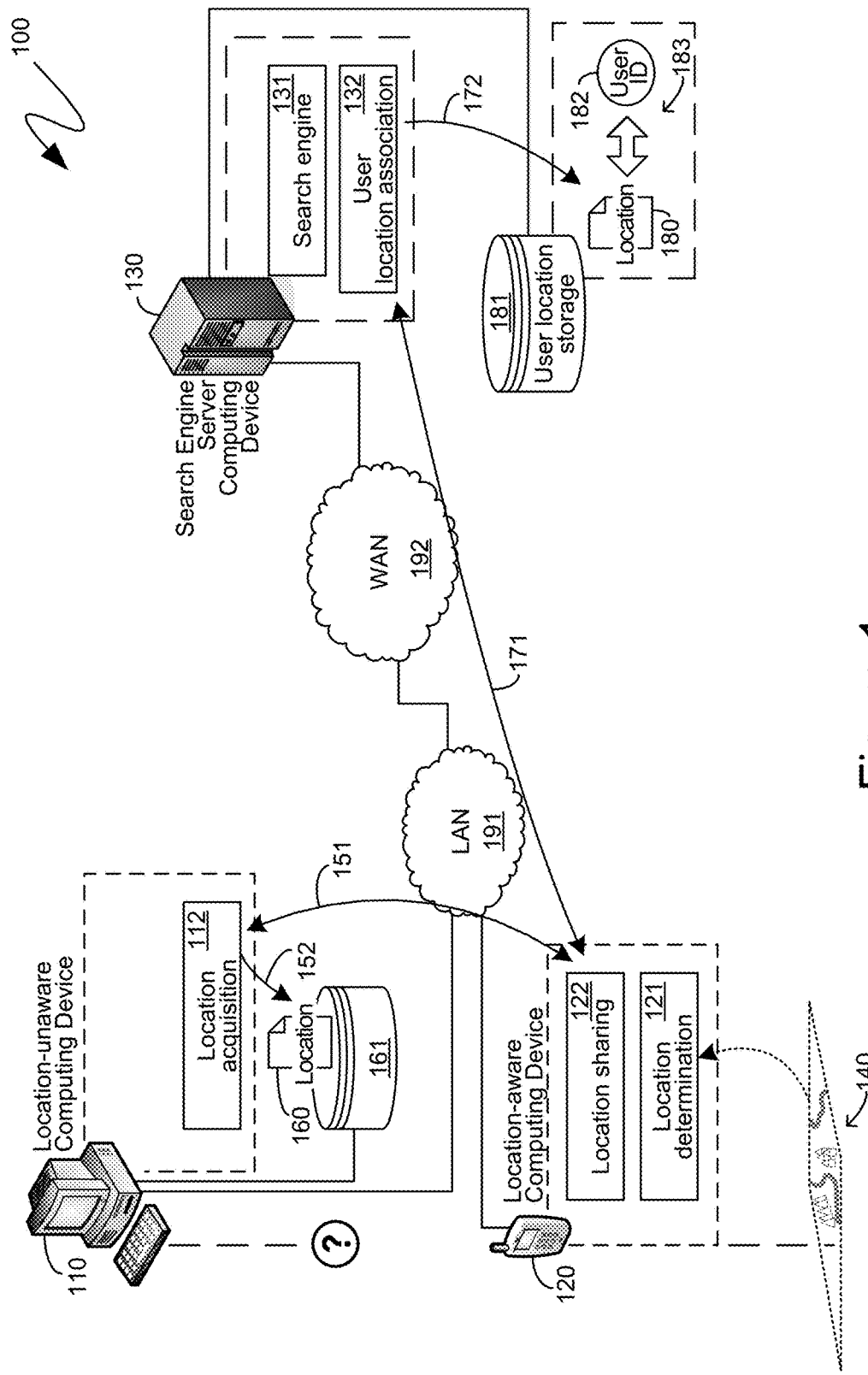
FIG. 1 is a system diagram of an exemplary system for providing location information with search queries from location-unaware computing devices.

The following description relates to increasing a user's interaction performance with a search engine by sharing a geographic location, obtained by a location-aware computing device, with a location-unaware computing device such that user interaction with a search engine through the location-unaware computing device can still include, when appropriate, a geographic location associated with the user, thereby increasing the relevance and aptness of the search results presented to the user and, accordingly, increasing user interaction performance with the search engine. The geographic location obtained by a location-aware computing device can be shared with the location-unaware computing device through short range communicational connections, such that both the location-aware computing device and the location-unaware computing device are physically proximate to one another, and the geographic location obtained by the location-aware computing device can, appropriately, be utilized as a geographic location of the location-unaware computing device as well. Geographic location information can be received by a location-unaware computing device prior to being utilized in conjunction with searches issued to a search engine through such a location-unaware computing device, and can be updated on a determined periodicity. Geographic location information can be provided, from a location-aware computing device, to a centralized, networked computing device and associated thereon with a user identifier such that the user corresponding to such a user identifier, when issuing searches to a search engine through a location-unaware computing device, can have the associated geographic location information utilized in conjunction with such searches. In such an instance, the geographic location information need not be locally retained or exchanged. Geographic location information can also be associated with an entity, such as an entity whose geographic location is variant, to improve the identification of such an entity as being responsive to other users' search queries.

As indicated, the obtaining of an accurate geographic location for a user when the user is utilizing a location-unaware computing device, such as from a location-aware computing device, increases the relevance and aptness of the search results presented to the user and, thereby, increases such a user's interaction performance with the search engine. The user's interaction performance is further increased through the sharing of location information because the user is now presented with consistent search results across their devices. By way of an example, if the location sharing mechanisms described below are not utilized, a search that implicitly references the user's current location will return different search results when performed from location-aware computing devices, such as the user's cell phone, than when performed from location-unaware computing devices, such as the user's desktop computing device. In such an instance, a user will receive different search results for the same search depending on which device the user uses to perform the search. Such inconsistent search results are confusing to users and reduce user interaction performance with the search engine. By contrast, the location sharing mechanisms described below facilitate the provision of consistent search results across all of the user's computing devices, thereby further increasing the user's interaction performance with the search engine.

The location sharing mechanisms described below also aid the search engine in that the location of users performing searches enables the search engine to more accurately identify relevant and apt search results. For example, patterns of searches and search results monitored by search engines include geographic patterns, which can be utilized to identify popular search results, entities and the like, which can, then, be further utilized to improve the accuracy and aptness of subsequently presented search results. The location sharing mechanisms described below, in providing more accurate location information for search queries originating from location-unaware computing devices, increases the search engine's ability to monitor and improve its results and its operation.

The techniques described herein make reference to a "search engine" and a "geographic location". As will be recognized by those skilled in the art, and as utilized herein, the term "search engine" means the computer-executable instructions, the computing devices, or combinations thereof, that provide the ability to receive a search query from a user, reference a set of data to identify data that is responsive to the user's search query, and provide such responsive data to the user. Additionally, as will also be recognized by those skilled in the art, and as utilized herein, the terms "geographic location" and "location" mean a defined physical area identified by specific coordinates according to a physical coordinate system applied to the Earth, or a portion thereof.

Additionally, while the techniques described herein are directed to mechanisms that make use of the ubiquitous World Wide Web search engines, they are not meant to suggest a limitation of the described techniques specifically to Internet search engines accessible through search engine websites. To the contrary, the described techniques are equally utilizable with any search engine, searching any set of data, that can utilize location information to further tailor the results returned to a user performing such a search so that the returned results are more likely to be what the user was searching for.

Although not required, the description below will be in the general context of computer-executable instructions, such as program modules, being executed by a computing device. More specifically, the description will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including hand-held devices, multi-processor systems, microprocessor based or programmable consumer electronics, network PCs, minicomputers, mainframe computers, and the like. Similarly, the computing devices need not be limited to stand-alone computing devices, as the mechanisms may also be practiced in distributed computing environments where tasks are performed by remote processing devices that are linked through a communications network. In a distributed computing environment, program modules may be located in both local and remote memory storage devices.

With reference to FIG. 1, an exemplary system 100 is illustrated, providing context for the descriptions below. The exemplary system 100 of FIG. 1 is shown as comprising a location-unaware computing device, such as the exemplary location-unaware computing device 110, and a location-aware computing device, such as the exemplary location-aware computing device 120. By way of example, the location-unaware computing device can be a ubiquitous desktop computing device, laptop computing device, or other like computing device that can lack software, hardware, or combinations thereof by which such a computing device can determine its geographic location. By contrast, the location-aware computing device can be, for example, a smart phone computing device, tablet computing device, or other like computing device comprising software, hardware, or combinations thereof by which such a computing device can determine its geographic location. As one example, Global Positioning System (GPS) hardware can enable a location-aware computing device, such as exemplary location-aware computing device 120, to determine its geographic location in a manner well known to those skilled in the art. In the exemplary system 100 of FIG. 1, the exemplary location-aware computing device 120 is illustrated as determining its location 140 through a location determination component 121. As indicated, such a location determination component 121 can comprise GPS hardware, corresponding software or drivers, or other like hardware, software or combinations thereof.

According to one aspect, a location-aware computing device, such as exemplary location-aware computing device 120, can further comprise a location sharing component 122 by which the exemplary location-aware computing device 120 can share its location 140 with other computing devices. For example, the location sharing component 122 can comprise computer-executable instructions that can display options to a user by which a user can explicitly allow the location 140 of the location-aware computing device 120 to be shared. More specifically, to protect users' privacy, users would be required to take one or more affirmative actions before location information, such as information identifying the location 140 of the exemplary location-aware computing device 120 could be shared, collected, stored or utilized, and, in the absence of such affirmative action, a user's personal information, including, for example, information identifying the location 140, would not be shared or otherwise transmitted or utilized outside of the location-aware computing device 120.

In addition to a user interface aspect, the exemplary location sharing component 122 can further comprise computer-executable instructions that can establish a communicational connection with a corresponding location acquisition component, such as the exemplary location acquisition component 112, executing on the exemplary location-unaware computing device 110. For example, exemplary location sharing component 122 can communicate through predefined network ports, or on predefined communicational channels, that can also be known and utilized by the exemplary location acquisition component 112, thereby enabling at least one of those two components to broadcast its availability and at least one other of those two components to receive such a broadcast, generate a return response, and thereby initiate the establishment of a communicational connection, such as exemplary communicational connection 151, between them.

According to one aspect, the exemplary communicational connection 151 between the exemplary location sharing component 122 and the exemplary location acquisition component 112, executing on the exemplary location-aware computing device 120 and the exemplary location-unaware computing device 110, respectively, can be established across short-range or localized communicational infrastructure. For example, the exemplary communication connection 151 to be established across a local area network 191, such as would serve a home, a small office, or another other like small discrete set of users. For example, the exemplary local area network 191 can comprise a wireless local area network and each of the location where kidding device 120 and the location unaware computing device 110 can be communicationally coupled to such a same wireless local area network. As another example, the local area network 191 can comprise a point-to-point communication connection between the exemplary location-aware computing device 120 and the exemplary location-unaware computing device 110. Short range, point-to-point communicational protocols, such is the ubiquitous Bluetooth® communicational protocol, can be utilized to establish the communication connection 151. In such a manner, because the exemplary communication connection 151 is established through communicational mechanisms that are indicative of a physical, or geographic, closeness, the location 140 of the exemplary location-aware computing device 120 can be sufficiently physically proximate to the actual location of the location unaware computing device 110 that, for search for other like purposes, the location 120 of the exemplary location where computing device 120 can also be utilized as the location of the exemplary location unaware computing device 110.

As with the location sharing component 122, location acquisition component 112 can also comprise user interface aspect that can present a user interface to, for example, the user of the location where computing device 110, through which such a user can indicate their desire to obtained location information for the exemplary location-unaware computing device 110. Thus, to protect users' privacy, users would be required to take one or more affirmative actions before location information, such as information identifying the location of the exemplary location-unaware computing device 110 could be collected, stored or utilized, and, in the absence of such affirmative action, a user's personal information, including, for example, information identifying location 140, would not be collected or otherwise utilized.

Once the communicational connection 151 is established between a location-aware computing device, such as exemplary location-aware computing device 120, and a location on aware computing device, such as the exemplary location unaware computing device 110, the location 140 of the location-aware computing device 120 can be exchanged, through the exemplary communication connection 150, with the location unaware computing device 110, and such location information 160 can be stored locally on the location unaware computing device 110, such as on the exemplary computer-readable storage media 161, as illustrated by the arrow 152. For further protection of user privacy the location information 160 can, optionally, be stored in an encrypted format.

Additionally, the location information 160 can be periodically updated, or can be updated when the location information 160, as stored on the location-unaware computing device 110, is older than a threshold amount of time. Such a periodicity or threshold amount of time can be automatically established, or either or both can be established in accordance with explicitly enumerated user preferences. Additionally, such user preferences can be established on either or both of the location-aware computing device 120 or the location-unaware computing device 110. For example, a user utilizing the location-aware computing device 120 can specify that, while the location 140 of the location-aware computing device 120 can be shared, such information is only to be shared at a maximum frequency of once an hour. Such a setting can, for example, reduce the consumption of energy from a limited battery that supplies power to the location-aware computing device 120 and, thereby, conserve battery life. By contrast, a user on the location-unaware computing device can specify that the location information 160 is to be updated, for example, once every two hours. In such an instance, while the location sharing component 122 executing on the location-aware computing device 120 may be available to share the location 140 of the location where computing device 120 once each hour, the location acquisition component 112, executing on the location-unaware computing device 110, may only request location information 160 once every two hours. In a converse scenario, where the user of the location unaware computing device 110 specifies an update periodicity of the location information 160 that is more frequent than the user of the location-aware computing device 120 has allowed the location 140 to be shared, the location acquisition component 112, executing on the location-unaware computing device 110 may attempt to obtain location information 160 more frequently than the location sharing component 122, executing on the location-aware computing device 120, may provide such location information 160. While update periodicities and thresholds of staleness have been identified in terms of hours, any appropriate interval of time can be utilized. For example, the location information 160 can be updated every five minutes, every thirty minutes, once an hour, once every couple of hours, a couple of times a day, once a day, a couple of times a week, once a week or any other interval of time.

Alternatively to being stored on the location-unaware computing device 110, or in addition thereto, the location information 160 can be stored remotely from the location-unaware computing device 110. For example, the location sharing component 122, executing on the location-aware computing device 120, can establish a communicational connection, such as the exemplary communication connection 171, with a user location association component 132, such as could be executing on a server computing device, such as the exemplary search engine server computing device 130. As illustrated in the exemplary system 100 of FIG. 1, the search engine server computing device 130 can be communicationally coupled to a wide-area network, such as the exemplary wide-area network 192, to which can also be communicationally coupled the location-aware computing device 120, such as via the aforementioned local area network 191. As will be recognized by those skilled in the art, the wide-area network 192 can be the Internet, although the mechanisms described herein are not so limited. Additionally, and as will also be recognized by those skilled in the art, the illustrated search engine server computing device 130 is strictly exemplary and is meant to represent any one or more server computing devices operating in concert to host the execution of computer-executable instructions providing search engine functionality, such as that represented by the exemplary search engine 131, as well as computer-executable instructions providing the user location association functionality, such as that represented by the user location association component 132.

The exemplary communicational connection 171, between the location sharing component 122, executing on the location-aware computing device 120, and the user location association component 132, executing on the search engine server computing device 130, can be established by, for example, the location sharing component 122 initiating communications with a predefined network domain, website address, or other like network identifier by which communications can be directed to computing devices, such as the search engine server computing device 130. As with the exemplary communications 151, location sharing component 122 can provide, through the exemplary communicational connection 171, location information 180 indicative of the location 140 of the location-aware computing device 120. Upon receiving such location information 180, user location association component 132 can store such location information 180 in a user location storage, such as the exemplary user location storage 181. The location information 180 can be further associated with a user identifier, such as the exemplary user identifier 182, as illustrated by the association 183. As will be described in further detail below, when a user, identified by the user identifier 182, utilizes, for example, the location-unaware computing device 110 to perform a search utilizing the search engine 131, the location information 180 associated with the user identifier 182 can be utilized by the search engine 131 to improve the aptness of the search results returned to such a user.

Figure 2:
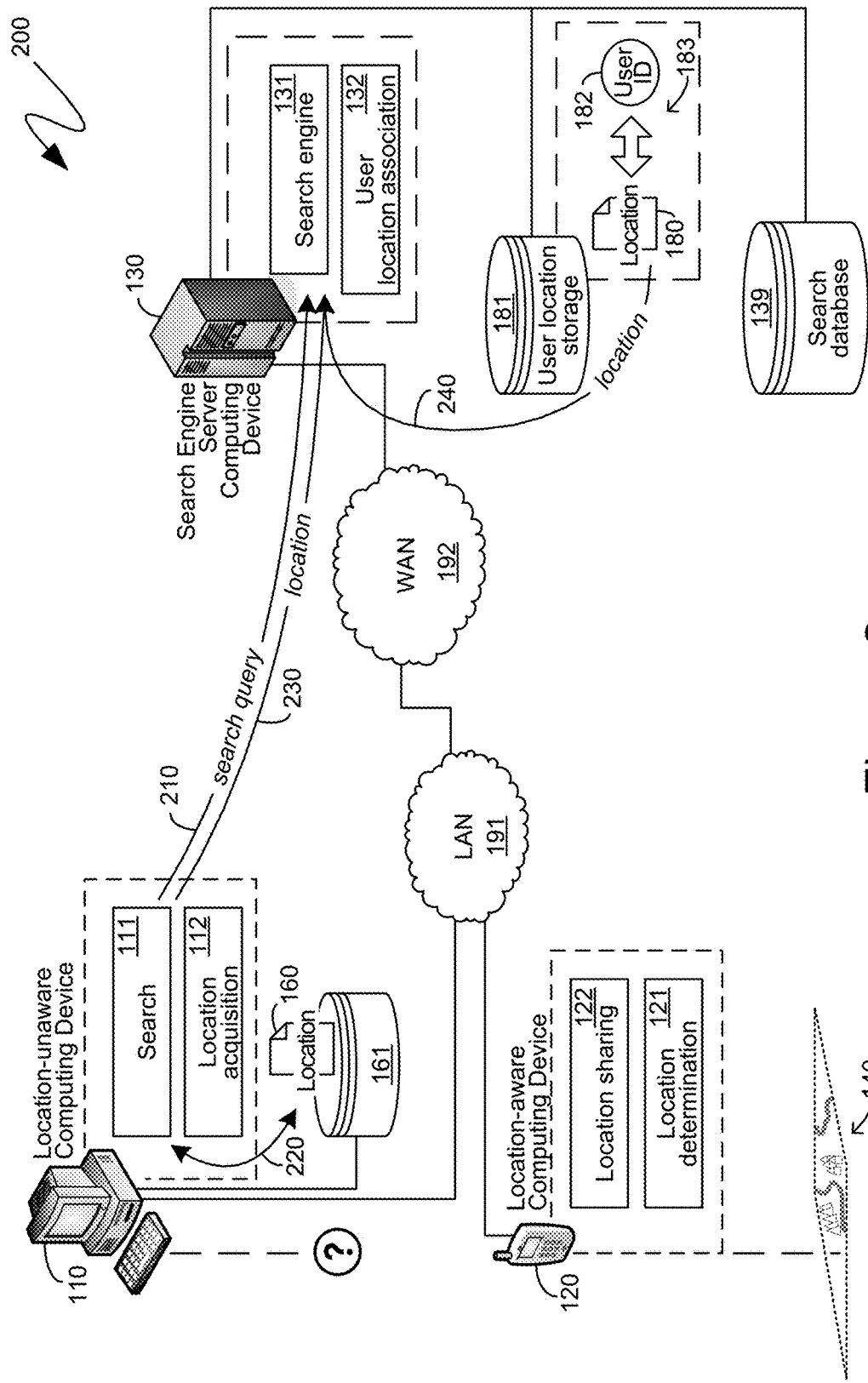
FIG. 2 is a block diagram of another exemplary system for providing location information with search queries from location-unaware computing devices.
Figure 3:
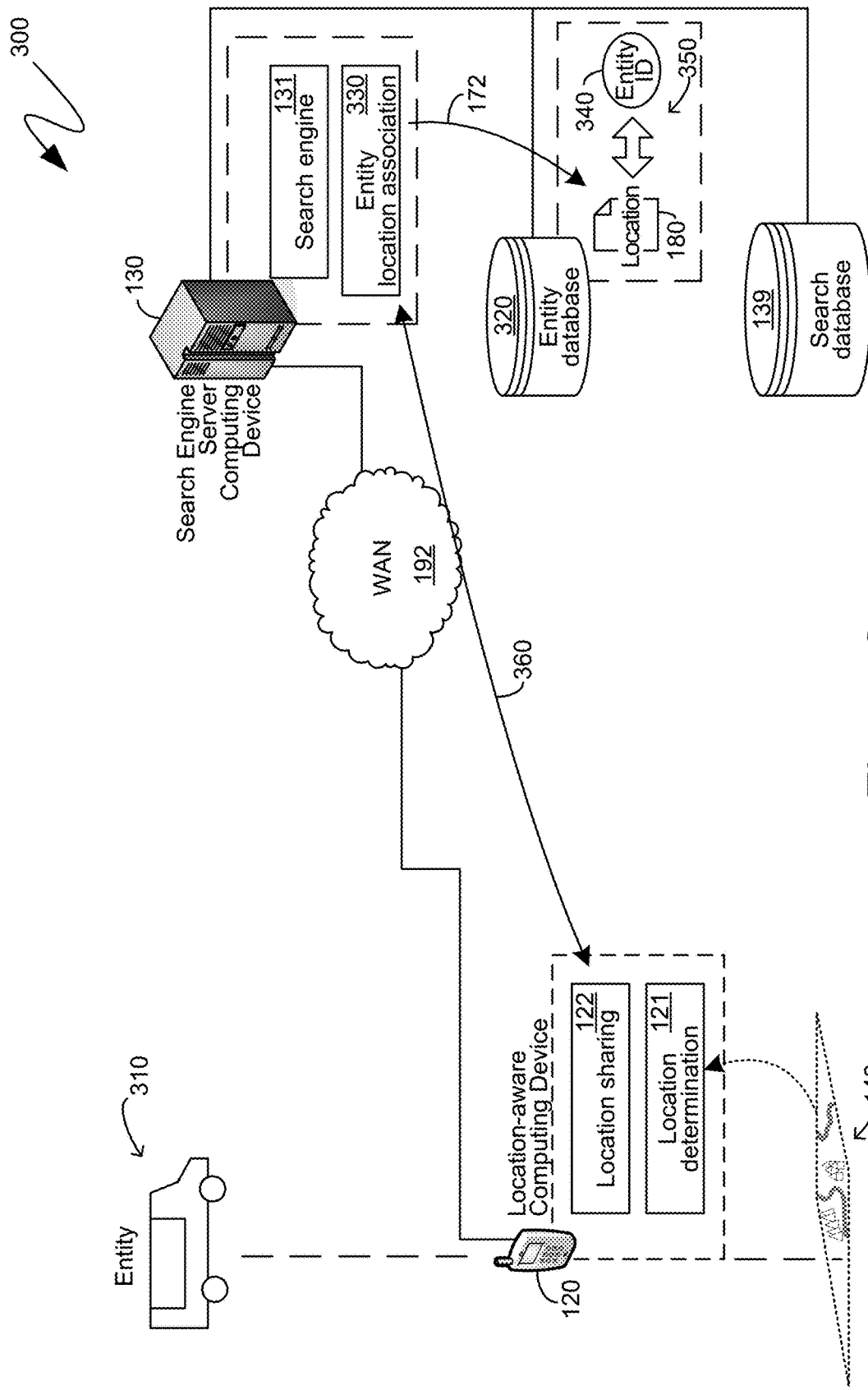
FIG. 3 is a block diagram of an exemplary system for providing location information of transient entities to improve location-centric search queries.

Turning to FIG. 2, the exemplary system 200 shown therein illustrates utilization of location information, such as the exemplary location information 160 stored on the location-unaware computing device 110, the exemplary location information 180, which can be stored on a server computer device, or combinations thereof, to improve the search results provided to a user performing a search on a location-unaware computing device and, thereby, increase such a user's interaction performance with the search engine. More specifically, and with reference to FIG. 2, a search query 210 can be issued to a search engine, such as the exemplary search engine 131, from a user utilizing search functionality 111 on a location-unaware computing device, such as the exemplary location-unaware computing device 110. As indicated previously, the search engine 131 can be comprised of computer-executable instructions executed across one or more server computing devices which, with reference to a search database, such as exemplary search database 139, can identify information, such as webpages, documents, entities, people, or other like information that is deemed to be responsive to the search query 210. Typically, the search functionality 111 can be provided to a user of the location-unaware computing device 110 through a ubiquitous web browser application program. More specifically, a web browser application program executing on the location-unaware computing device 110 can be directed by a user to establish a communication connection with the search engine 131, such as through a search engine website, which can be presented to the user, through a user interface generated by such a web browser application program, and can, thereby, enable the user to enter the search query 210. Other forms of presenting the user with search functionality 111 are equally applicable to the mechanisms described herein including, for example, search functionality presented through content creation application programs, database access application programs, and other like application programs.

In some instances, the search query 210 can comprise an explicit indication of one or more geographic locations, such as, for example, by comprising keywords identifying geographic locations. For example, a user could search for "steak restaurant Seattle", in which case the search term "Seattle" can be an explicit specification of a geographic location, namely the city of Seattle, Wash., and the combination of search terms "steak", "restaurant" and "Seattle" can be interpreted, such as by the search engine 131, as being a search for steak restaurants geographically located in or near the city of Seattle, Wash. As will be recognized by those skilled in the art, search engines, such as the exemplary search engine 131, can utilize geographic information to more accurately identify, from among the information referenced by, or contained in, the search database 139, search results that are deemed to be responsive to the search query 210 and which the user is more likely regard as being what the user was looking for. For example, returning to the above example where the search query 210 is "steak restaurant Seattle", the explicitly specified geographic location of the city of Seattle, Wash. can be utilized, by the search engine 131, to focus its search only on information associated with steak restaurants that are physically located within Seattle, Wash., to the exclusion of, for example, steak restaurants located in New York or Los Angeles.

In other instances, the search query 210 can still be location centric, in the sense that the user is searching for information that references or is associated with a particular location, but that location is not explicitly specified. In instances where users submit search queries that only implicitly specify a location, the search engine 131 can utilize the location of the user performing the search to more accurately identify search results that are deemed to be responsive to the search query 210 and which the user is more likely to regard as being what the user was looking for. For example, if the user entered a search query of "steak restaurant", it is likely that the user is searching for a steak restaurant that is proximate to their current location, as opposed to, for example, general information about steak restaurants or, conversely, as another example, steak restaurants in some other, random geographic location. Thus, to the extent that the search engine 131 can be provided with the location of the user issuing the search for "steak restaurant", the search engine 131 can more accurately identify those search results that the user is more likely to regard as being what they were looking for. If the user was utilizing a location-unaware computing device to perform such a search, such as, for example, the location-unaware computing device 110, in the absence of the mechanisms described herein, the search engine 131 would be limited to inaccurate derivations of such a user's location. For example, the search engine 131 could determine, such as from the network communicational packets transporting the search query 210, a network address of the location-unaware computing device 110. Such a network address can, under certain circumstances, identify an approximate geographic location of the location unaware computing device 110. Unfortunately, as will be recognized by those skilled in the art, such a network address can also identify incorrect geographic locations, including in situations where the location-unaware computing device 110 is communicationally coupled to the wide-area network 192 through a virtual private network, or other like mechanism that can obfuscate a network address, or utilize network addresses of geographic locations that differ substantially from the actual geographic location of the location-unaware computing device 110.

However, if the location unaware computing device 110 had stored thereon location information 160, acquired such as in the manner described in detail above, then such location information 160 can be provided, as illustrated by the communication 230, to be utilized in connection with the search query 210 and enable the search engine 131 to more accurately identify search results that the user of such a location-unaware computing device 110 is more likely to regard as being what they were looking for. More specifically, a determination can be made as to whether the search query 210 implicitly references a geographic location, such as by being a location-centric search query without explicitly specifying a specific geographic location. If it is determined that the search query 210 implicitly references a geographic location, then the stored location information 160 can be provided, as illustrated by the communication 230, and the search engine 131 can utilize such location information 160 in the same manner as it would have utilized explicitly indicated location information, such as described above. The determination of whether a search query implicitly references a geographic location can be made either by computer-executable instructions executing on the location unaware computing device 110, such as scripts that were received by a web browser application program from the search engine 131 and executed through the web browser application program on the location-unaware computing device 110, or can be made by computer-executable instructions executing as part of the search engine 131 after receiving the search query 210, or combinations thereof. For example, if the determination that the search query 210 implicitly references a geographic location is made by the search engine 131, additional communications can be exchanged between the search engine 131 and, for example, the web browser application program executing on the location-unaware computing device 110 through which the user initially submitted the search query 210. Such additional communications can include scripts or other like computer-performable instructions that can be executed on the location-unaware computing device 110, acquire the location information 160, such as from the computer readable storage media 161, and return such location information 162 the search engine 131, as illustrated by the communication 230.

According to another aspect, rather than obtaining the location information 160 from the location-unaware computing device 110 from which the user submitting the search query 210, the search engine 131 can obtain such location information, such as in the form of the location information 180, from a user location storage 181. For example, in addition to having access to a search database 139, the search engine 131 can also have access to a user location storage, such as exemplary user location storage 181. As indicated previously, stored thereon can be an association 183 between location information 180 and a user identifier 182. Consequently, if the user utilizing the location-unaware computing device 110 to generate and issue the search query 210 had identified themselves to the search engine 131, such as by logging on or otherwise providing indicia of user identity, the search engine 131 can utilize the users identity to reference the user location storage 181 and find location information 180 associated with the user identifier 182 matching the user identifier provided by the user. As indicated by the communication 240, the location information 180 can then be obtained from the user location storage 181 and utilized to more accurately identify search results that the user is more likely to regard as being what they were looking for when submitting the search that only implicitly specifies a location. In such a manner, because the search engine 131 can return more accurate search results, the user's interaction performance with such a search engine can be improved and increased.

Exemplary system 300 shown therein illustrates an alternative utilization of the location sharing functionality described above. More specifically, the location 140, of the location-aware computing device 120, as determined by the location determination component 121, can be provided to the search engine computing device 130 through communicational connection 360 between a location sharing component 122, executing on the location-aware computing device 120, and an entity location association component 330 executing on the search engine server computing device 130, in a manner analogous to that described in detail above. Rather than storing the location as being associated with a user, the entity location association component 330 can store the provided location at location information 180 in an entity database 320, where such location information 180 can be associated with an entity identifier, such as the exemplary entity identifier 340, as illustrated by the association 350. As will be recognized by those skilled in the art, search engines can maintain entity databases, either separately from the search database, such as exemplary search database 139, or as a part thereof, and such entity databases can comprise information regarding entities identified by the search engine. As also recognized by those skilled in the art, and as utilized herein, the term "entity" means a specific individual, organization, corporation, event, place, everything that is recognized as such by a search engine, such that the search engine organizes and links information based on such a recognition. By way of a simple example, a person or business that has registered with the search engine is an "entity", since the search engine has linked certain information regarding that entity together. For example, a person can have information such as their profile picture, their prior searches, or other like information linked together by the search engine. As another example, a business can have information such as the hours they are open, current specials and other like information linked together by the search engine's conceptualization of that business as an entity.

By associating the location information 180 with an entity identifier 140, the entity database 320 can remain updated and accurate as to locations of entities, such as the exemplary entity 310, whose location can be transient or mobile. For example, the entity 310 can be a food truck that can park in different locations on different days to serve food. Continuing with such an example, if the entity 310 parks outside of an office building, and a user that is geographically located within such office building utilizes the search engine 131 to search for restaurants that are close to such a user, it can be advantageous for the search engine 131 to identify the entity 310 as being geographically proximate to such a user, and provide information regarding such an entity 310 to the user as a result of the user's search. Consequently, maintaining the location information 180 associated with the entity 310 enables the search engine to provide more accurate search results, and such stored location information can be further advantageous for the entity 310, because such an entity can receive increased attention, and, thereby, increased income, as a result of the search engine's maintenance of its location.

As before, the location information 180 can be updated periodically, or if it is older than a threshold amount of time. The periodicity or threshold amount of time set for the updating of the location information 180 can be selected in accordance with the mobility of the entity 310. For example, if the entity 310 is a food truck that parks in multiple different locations throughout the day, the location information 180 can be updated multiple times a day. Another example, if the entity 310 stays in one location for several weeks at a time, location information 180 can be updated less frequently. As before, the updating of the location information 180 can be controlled by explicit user settings obtained through a user interface presented to the user by, for example, the location sharing component 122.

Figure 4:
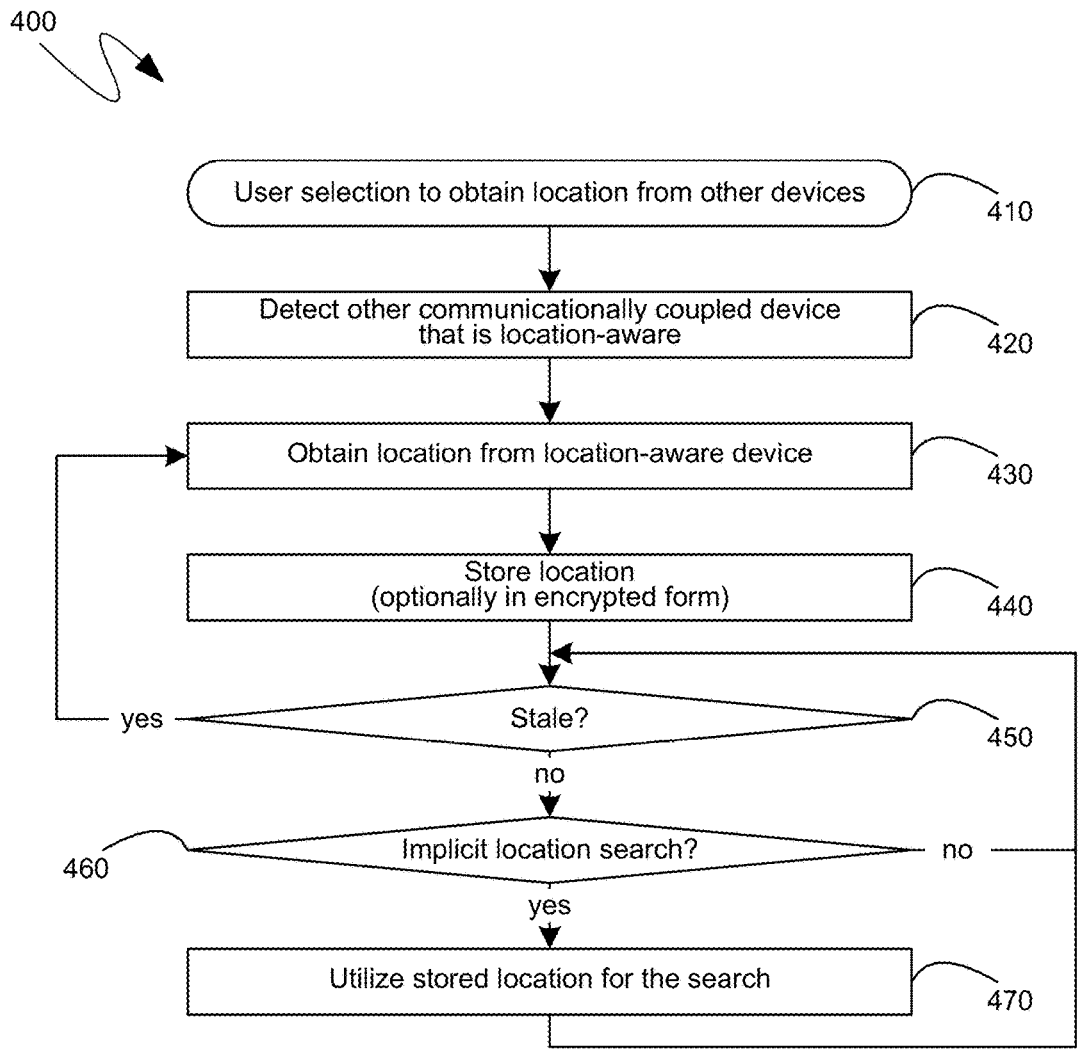
FIG. 4 is a flow diagram of an exemplary provision of location information with search queries from location-unaware computing devices.

Turning to FIG. 4, the exemplary flow diagram 400 shown therein illustrates an exemplary series of steps that can be performed in order to obtain a more accurate geographic location for a user utilizing a location-unaware computing device. Initially, at step 410, the user can explicitly authorize the obtaining of location information from other computing devices, including computing devices deemed proximate to such a user by virtue of their communicational connection to a same local area network as the location-unaware computing device that the user utilizing. Subsequently, at step 420, other communicationally coupled computing devices that are location-aware, and whose location has been allowed to be shared, can be detected. For example, and as indicated previously, pre-established communicational ports, network addresses, identifiers, or other like communicational constructs can be utilized to establish a communication connection between a location-aware computing device and a location-unaware computing device for purposes of sharing location information from the former to the latter. At step 430 the location of the location-aware computing device can be obtained from such a location-aware computing device.

Subsequently, at step 440, such obtained location information can be stored, including being optionally stored in encrypted form.

At step 450, an optional determination can be made as to whether the location information that is stored is "stale", such as, for example, by being older than a threshold duration of time, by having reached the end of the cycle defined by the periodicity with which such location information is to be updated, or other like temporal considerations. If, at step 450, it is determined that the location information is stale, processing can return to step 430 and updated location information can be received. Conversely, if, at step 450, it is determined that the stored location information remains appropriate, in view of a preestablished update cycle, processing can proceed to step 460 and a determination can be made whether a search that implicitly references the user's location has been made. If no such search has been made, processing can return to step 450. However, if such a search has been made then, at step 470, the location stored at step 440 can be utilized as if it was explicitly specified by the search so as to further focus the search results.

The sequential ordering of the steps of the exemplary flow diagram 400 of FIG. 4 is provided strictly for illustrative purposes, and is not meant to indicate a mandatory order. As one example, the monitoring of a user's search, to detect a search that implicitly identifies a location, such as at step 460, can be performed in parallel to steps 420 through 450. Additionally, exemplary flow diagram 400 can be performed by the location-unaware computing device, one or more server computing devices, including server computing devices implementing search functionality, or combinations thereof. For example, the obtaining of the location from the location-aware computing device, at step 430, can be performed by the location-unaware computing device, such as across a local area network, or a point-to-point network established explicitly between the location on aware computing device and the location-aware computing device. Alternatively, or in addition, step 430 can be performed by one or more server computing devices, including the server computing devices providing search functionality, whereby the location can be provided to such server computing devices through wide-area network communications, such as across the ubiquitous Internet. Similarly, the storage of the obtained location, at step 440, can be performed locally on the location-unaware computing device, or remotely, such as into a user location store, as detailed above. Step 470, similarly, is indicative of the obtaining of a user's location by a search engine, either by transmitting scripts or other like instructions to the browser application program through which the user submitted a query, so as to obtain location information stored on the location on aware computing device executing such a browser, or by transmitting a request for the user's location to, for example, user location store or other like functionality that can be co-located with a search engine.

Figure 5:
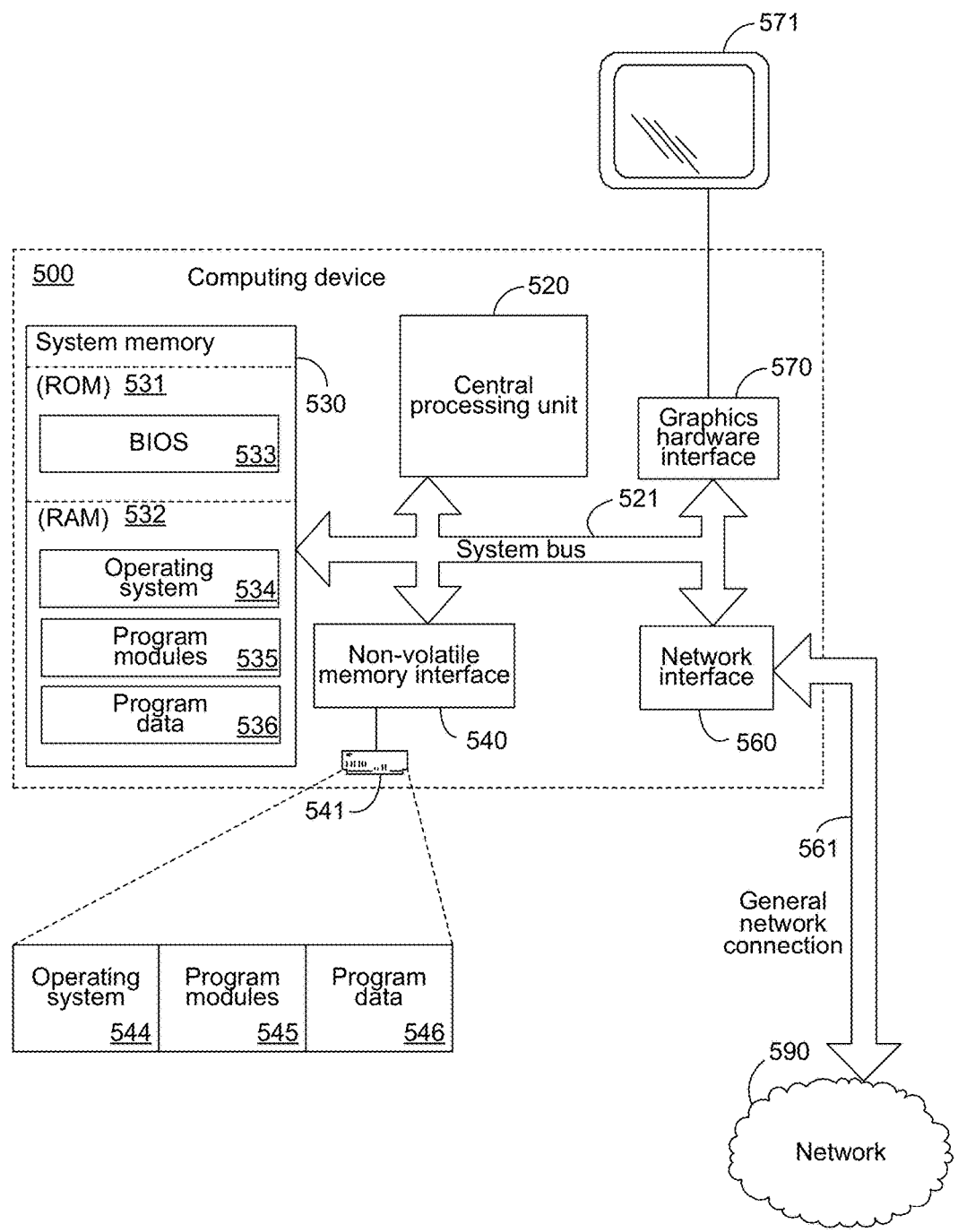
FIG. 5 is a block diagram of an exemplary computing device.

Turning to FIG. 5, an exemplary computing device 500 is illustrated which can perform some or all of the mechanisms and actions described above. The exemplary computing device 500 can include, but is not limited to, one or more central processing units (CPUs) 520, a system memory 530, and a system bus 521 that couples various system components including the system memory to the processing unit 520. The system bus 521 may be any of several types of bus structures including a memory bus or memory controller, a peripheral bus, and a local bus using any of a variety of bus architectures. The computing device 500 can optionally include graphics hardware, including, but not limited to, a graphics hardware interface 570 and a display device 571, which can include display devices capable of receiving touch-based user input, such as a touch-sensitive, or multi-touch capable, display device. Depending on the specific physical implementation, one or more of the CPUs 520, the system memory 530 and other components of the computing device 500 can be physically co-located, such as on a single chip. In such a case, some or all of the system bus 521 can be nothing more than silicon pathways within a single chip structure and its illustration in FIG. 5 can be nothing more than notational convenience for the purpose of illustration.

The computing device 500 also typically includes computer readable media, which can include any available media that can be accessed by computing device 500 and includes both volatile and nonvolatile media and removable and non-removable media. By way of example, and not limitation, computer readable media may comprise computer storage media and communication media. Computer storage media includes media implemented in any method or technology for storage of content such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired content and which can be accessed by the computing device 500. Computer storage media, however, does not include communication media. Communication media typically embodies computer readable instructions, data structures, program modules or other data in a modulated data signal such as a carrier wave or other transport mechanism and includes any content delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 530 includes computer storage media in the form of volatile and/or nonvolatile memory such as read only memory (ROM) 531 and random access memory (RAM) 532. A basic input/output system 533 (BIOS), containing the basic routines that help to transfer content between elements within computing device 500, such as during start-up, is typically stored in ROM 531. RAM 532 typically contains data and/or program modules that are immediately accessible to and/or presently being operated on by processing unit 520. By way of example, and not limitation, FIG. 5 illustrates operating system 534, other program modules 535, and program data 536.

The computing device 500 may also include other removable/non-removable, volatile/nonvolatile computer storage media. By way of example only, FIG. 5 illustrates a hard disk drive 541 that reads from or writes to non-removable, nonvolatile magnetic media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and other computer storage media as defined and delineated above. The hard disk drive 541 is typically connected to the system bus 521 through a non-volatile memory interface such as interface 540.

The drives and their associated computer storage media discussed above and illustrated in FIG. 5, provide storage of computer readable instructions, data structures, program modules and other data for the computing device 500. In FIG. 5, for example, hard disk drive 541 is illustrated as storing operating system 544, other program modules 545, and program data 546. Note that these components can either be the same as or different from operating system 534, other program modules 535 and program data 536. Operating system 544, other program modules 545 and program data 546 are given different numbers hereto illustrate that, at a minimum, they are different copies.

The computing device 500 may operate in a networked environment using logical connections to one or more remote computers. The computing device 500 is illustrated as being connected to the general network connection 561 through a network interface or adapter 560, which is, in turn, connected to the system bus 521. In a networked environment, program modules depicted relative to the computing device 500, or portions or peripherals thereof, may be stored in the memory of one or more other computing devices that are communicatively coupled to the computing device 500 through the general network connection 561. It will be appreciated that the network connections shown are exemplary and other means of establishing a communications link between computing devices may be used.

Although described as a single physical device, the exemplary computing device 500 can be a virtual computing device, in which case the functionality of the above-described physical components, such as the CPU 520, the system memory 530, the network interface 560, and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where the exemplary computing device 500 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executed within the construct of another virtual computing device. The term "computing device", therefore, as utilized herein, means either a physical computing device or a virtualized computing environment, including a virtual computing device, within which computer-executable instructions can be executed in a manner consistent with their execution by a physical computing device. Similarly, terms referring to physical components of the computing device, as utilized herein, mean either those physical components or virtualizations thereof performing the same or equivalent functions.

The descriptions above include, as a first example, a computing device comprising: one or more processing units; a network interface; and one or more computer-readable media comprising computer-executable instructions which, when executed by the one or more processing units, cause the computing device to: obtain, through the network interface, from a location-aware computing device, location information indicative of a geographic location of the location-aware computing device; store the obtained location information; detect a user search query, from a location-unaware computing device differing from the location-aware computing device from which the location information was received, the user search query implicitly specifying a locational aspect; and utilize the stored location information for the user search query.

A second example is the computing device of the first example, wherein the computing device is a server computing device executing at least a portion of a search engine to which the user search query is directed.

A third example is the computing device of the second example, wherein the obtained location information is stored in a user location storage and associated with a user identifier.

A fourth example is the computing device of the third example, wherein the stored location information is only utilized for the user search query if the user identifier with which the location information was associated is of the user submitting the user search query.

A fifth example is the computing device of the first example, wherein the computing device is the location-unaware computing device.

A sixth example is the computing device of the fifth example, wherein the computer-executable instructions causing the computing device to utilize the stored location information comprise computer-executable instructions, which, when executed by the one or more processing units, cause the location-unaware computing device to provide, to a search engine, the stored location information.

A seventh example is the computing device of the sixth example, wherein the computer-executable instructions causing location-unaware computing device to provide, to the search engine, the stored location information comprise scripts received from the search engine and performed through a browser application program through which the user search query was entered.

An eighth example is the computing device of the fifth example, further comprising a display device; wherein the one or more computer-readable media comprise further computer executable instructions, which, when executed by the one or more processing units, cause the location-unaware computing device to: generate, on the display device, a user interface through which a user authorizes the obtaining and the storing of the location information.

A ninth example is the computing device of the fifth example, wherein the one or more computer-readable media comprise further computer executable instructions, which, when executed by the one or more processing units, cause the location-unaware computing device to: encrypt the obtained location information prior to storing it on the location-unaware computing device.

A tenth example is the computing device of the fifth example, wherein the one or more computer-readable media comprise further computer executable instructions, which, when executed by the one or more processing units, cause the location-unaware computing device to: establish, through the network interface, a point-to-point communicational connection between the location-unaware computing device and the location-aware computing device.

An eleventh example is the computing device of the fifth example, wherein the location-unaware computing device is communicationally coupled to a local area network via the network interface, and wherein further the location-aware computing device is communicationally coupled to the same local area network.

A twelfth example is the computing device of the first example, wherein the one or more computer-readable media comprise further computer executable instructions, which, when executed by the one or more processing units, cause the computing device to: repeat the obtaining and storing of the location information if the stored location information was last updated more than a threshold amount of time ago.

A thirteenth example is a method of increasing search result relevance and aptness and, accordingly, increasing user interaction performance with a search engine, the method comprising: obtaining, from a location-aware computing device, location information indicative of a geographic location of the location-aware computing device; associating the obtained location information with an entity, differing from the location-aware computing device, the obtained location information being used as a location of the entity; storing the association between the location information and the entity in an entity database accessible by the search engine; and repeating the obtaining, associating and storing if the location information was last updated more than a threshold amount of time ago.

A fourteenth example is the method of the thirteenth example, further comprising: receiving a location centric search query; and identifying the entity as being responsive to the search query based at least in part on the location information.

A fifteenth example is a system comprising: a location-aware computing device comprising a location determination component that can determine a geographic location of the location-aware computing device; a location-unaware computing device; and a search engine server computing device; wherein at least one of the location-unaware computing device or the search engine server computing device perform steps comprising: obtain location information indicative of the geographic location of the location-aware computing device; store the obtained location information; detect a user search query implicitly specifying a locational aspect; and utilize the stored location information for the user search query.

A sixteenth example is the system of the fifteenth example, wherein the obtained location information is stored in association with a user identifier in a user location storage communicationally coupled to the search engine server computing device if the search engine server computing device performs the storing.

A seventeenth example is the system of the fifteenth example, wherein the obtained location information is stored on the location-unaware computing device.

A eighteenth example is the system of the fifteenth example, wherein the obtaining and the storing are repeated if the stored location information was last updated more than a threshold amount of time ago.

A nineteenth example is the system of the fifteenth example, wherein the location-aware computing device further comprises: one or more processing units; a display device; and one or more computer-readable media comprising computer-executable instructions which, when executed by the one or more processing units, cause the location-aware computing device to generate, on the display device, a user interface through which the user controls the sharing of the location information.

An twentieth example is the system of the fifteenth example, wherein the obtained location information is also stored in association with an entity identifier in an entity database communicationally coupled to the search engine server computing device; and wherein further the search engine server computing device identifies the entity as being responsive to another search query based at least in part on the location information.

As can be seen from the above descriptions, mechanisms for providing location information for location-unaware computing devices have been presented. In view of the many possible variations of the subject matter described herein, we claim as our invention all such embodiments as may come within the scope of the following claims and equivalents thereto.

We claim:

1. A location-unaware computing device comprising:
   one or more processing units;
   a network interface; and
   one or more computer-readable media comprising computer-executable instructions which, when executed by the one or more processing units, cause the location-unaware computing device to:
   obtain, through a short-range communicational connection established between the location-unaware computing device and a location-aware computing device, location information indicative of a geographic location of the location-aware computing device;
   store the obtained location information on a local storage device communicationally coupled to the location-unaware computing device; and
   utilize the stored location information for a user search query that implicitly specifies a locational aspect, the user search query being transmitted from the location-unaware computing device to a search engine through a network to which the location-unaware computing device and the search engine are both communicationally coupled;
   wherein the location-unaware computing device and the location-aware computing device are communicationally coupled to the network independently of one another.

2. The computing device of claim 1, wherein the one or more computer-readable media comprise further computer executable instructions, which, when executed by the one or more processing units, cause the computing device to:
   repeat the obtaining and storing of the location information if the stored location information was last updated more than a threshold amount of time ago.

3. The location-unaware computing device of claim 2, wherein the threshold amount of time is limited by a frequency with which the location-aware computing device is allowed to share its location.

4. The location-unaware computing device of claim 3, wherein the frequency with which the location-aware computing device is allowed to share its location is based on a battery life of the location-aware computing device.

5. The location-unaware computing device of claim 2, wherein the threshold amount of time is based on a mobility of the location-unaware computing device.

6. The location-unaware computing device of claim 1, wherein the computer-executable instructions causing the computing device to utilize the stored location information comprise computer-executable instructions, which, when executed by the one or more processing units, cause the location-unaware computing device to provide, to a search engine, the stored location information.

7. The location-unaware computing device of claim 6, wherein the computer-executable instructions causing location-unaware computing device to provide, to the search engine, the stored location information comprise scripts received from the search engine and performed through a browser application program through which the user search query was entered.

8. The location-unaware computing device of claim 1, further comprising a display device; wherein the one or more computer-readable media comprise further computer executable instructions, which, when executed by the one or more processing units, cause the location-unaware computing device to:
   generate, on the display device, a user interface through which a user authorizes the obtaining and the storing of the location information.

9. The location-unaware computing device of claim 1, wherein the one or more computer-readable media comprise further computer executable instructions, which, when executed by the one or more processing units, cause the location-unaware computing device to:
   encrypt the obtained location information prior to storing it.

10. The location-unaware computing device of claim 1, wherein the short-range communicational connection between the location-unaware computing device and the location-aware computing device is established with
    a short range point-to-point communicational protocol.

11. The location-unaware computing device of claim 1, wherein the short-range communicational connection established between the location-unaware computing device and the location-aware computing device comprises a communicational connection between the location-unaware computing device and a local area wireless network base station via the network interface and an independent communicational connection between the location-aware computing device and the same local area wireless network base station.

12. A method of increasing search result relevance and aptness and, accordingly, increasing user interaction performance with a search engine, the method comprising:
    obtaining, from a location-aware computing device, location information indicative of a geographic location of the location-aware computing device;
    associating the obtained location information with a business whose location is transient or mobile;
    storing the association between the location information and the business in an entity database accessible by the search engine;
    providing the obtained location information as a location of the business in response to a received search query to which the business was deemed by the search engine to be responsive; and
    repeating the obtaining, associating and storing if the location information was last updated more than a threshold amount of time ago.

13. The method of claim 12, wherein the search engine identifies the business as being responsive to the search query based at least in part on the obtained location information.

14. The method of claim 12, wherein the threshold amount of time is based on a frequency with which the business whose location is transient or mobile has previously changed its location.

15. A system comprising:
    a location-aware computing device comprising a location determination component that can determine a geographic location of the location-aware computing device; and
    a location-unaware computing device comprising computer-readable media having computer-executable instructions encoded thereon which, when executed, cause the location-unaware computing device to:
- obtain location information indicative of the geographic location of the location-aware computing device through a short-range communicational connection established between the location-unaware computing device and the location-aware computing device;
- store the obtained location information on a local storage device communicationally coupled to the location-unaware computing device; and
- utilize the stored location information for a user search query that implicitly specifies a locational aspect, the user search query being transmitted from the location-unaware computing device to a search engine through a network to which the location-unaware computing device and the search engine are both communicationally coupled;

wherein the location-unaware computing device and the location-aware computing device are communicationally coupled to the same network independently of one another.

16. The system of claim 15, wherein the obtaining and the storing are repeated if the stored location information was last updated more than a threshold amount of time ago.

17. The system of claim 15, wherein the short-range communicational connection established between the location-unaware computing device and the location-aware computing device comprises a communicational connection between the location-unaware computing device and a local area wireless network base station via the network interface and an independent communicational connection between the location-aware computing device and the same local area wireless network base station.

18. The system of claim 16, wherein the threshold amount of time is based on a mobility of the location-unaware computing device.

19. The system of claim 15, wherein the location-aware computing device further comprises:
- one or more processing units;
- a display device; and
- one or more computer-readable media comprising computer-executable instructions which, when executed by the one or more processing units, cause the location-aware computing device to generate, on the display device, a user interface through which the user controls the sharing of the location information.

20. The system of claim 15, wherein the short-range communicational connection between the location-unaware computing device and the location-aware computing device is established with a short range point-to-point communicational protocol.

* * * * *